(12) United States Patent
Kancharla

(10) Patent No.: US 9,649,727 B2
(45) Date of Patent: May 16, 2017

(54) HIGH SPEED LASER CUTTING OF AMORPHOUS METALS

(71) Applicant: IPG Photonics Corporation, Oxford, MA (US)

(72) Inventor: Vijay Kancharla, Shrewsbury, MA (US)

(73) Assignee: IPG Photonics Corporation, Oxford, MA (US)

( * ) Notice: Subject to any disclaimer, the term of this patent is extended or adjusted under 35 U.S.C. 154(b) by 198 days.

(21) Appl. No.: 14/699,647

(22) Filed: Apr. 29, 2015

(65) Prior Publication Data

US 2015/0306706 A1    Oct. 29, 2015

Related U.S. Application Data

(60) Provisional application No. 61/985,720, filed on Apr. 29, 2014.

(51) Int. Cl.
| | |
|---|---|
| *B23K 26/38* | (2014.01) |
| *B23K 26/40* | (2014.01) |
| *B23K 26/073* | (2006.01) |
| *B23K 26/08* | (2014.01) |

(52) U.S. Cl.
CPC ............ *B23K 26/38* (2013.01); *B23K 26/073* (2013.01); *B23K 26/08* (2013.01); *B23K 26/4005* (2013.01)

(58) Field of Classification Search
CPC ................................. B23K 26/38; B23K 26/40
USPC ........................................ 219/121.67, 121.72
See application file for complete search history.

(56) References Cited

U.S. PATENT DOCUMENTS

| 4,328,411 A | * | 5/1982 | Haller .................... | B23K 15/08 |
| | | | | 219/121.12 |
| 4,356,377 A | | 10/1982 | Norton et al. | |
| 4,670,636 A | * | 6/1987 | Taub ...................... | B23K 15/08 |
| | | | | 219/121.18 |
| 4,783,983 A | | 11/1988 | Narasimhan | |
| 5,780,807 A | | 7/1998 | Saunders | |

(Continued)

FOREIGN PATENT DOCUMENTS

EP        0779185 B1    11/2003

OTHER PUBLICATIONS

PCT International Search Report and Written Opinion mailed Jul. 8, 2015, received in corresponding PCT Application No. PCT/US15/28280, 10 pgs.

*Primary Examiner* — Samuel M Heinrich
(74) *Attorney, Agent, or Firm* — Grossman Tucker Perreault & Pfleger, PLLC

(57) ABSTRACT

Laser cutting systems and methods are used to cut amorphous metal materials, such as thin amorphous metal ribbons or foils, with a relatively high speed. Embodiments of laser cutting systems and methods described herein also allow cutting with reduced crystallization, and thus reduced increases in thickness, at the cut edges and with reduced cracks or other cutting defects at the cut edges. A fiber laser, such as an Ytterbium fiber laser, is used to generate a laser beam with a power level greater than about 50 W. The laser beam is focused and directed at the amorphous metal material with a beam spot size of about 30 microns or less. The focused laser beam and the amorphous metal material are moved relative to each other at a speed greater than about 18 inches per second such that the focused laser beam cuts the amorphous metal material.

22 Claims, 9 Drawing Sheets

(56) References Cited

U.S. PATENT DOCUMENTS

| | | |
|---|---|---|
| 8,253,068 B2 | 8/2012 | Yuan et al. |
| 2011/0233177 A1* | 9/2011 | Panarello ............. B23K 26/364 219/121.69 |
| 2013/0237035 A1 | 9/2013 | Osako et al. |

* cited by examiner

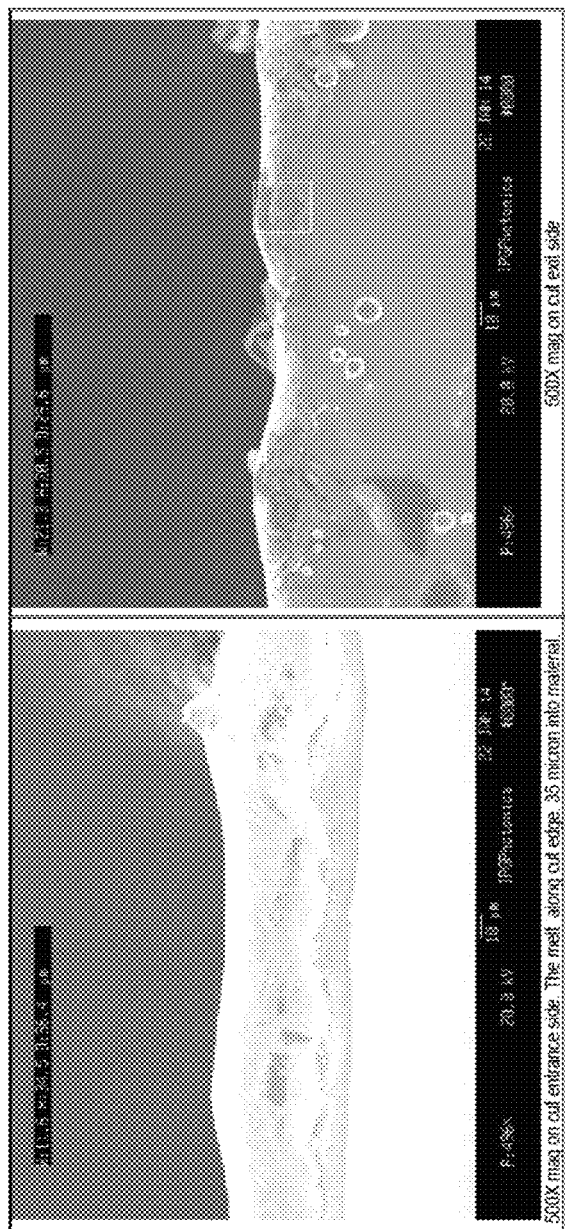
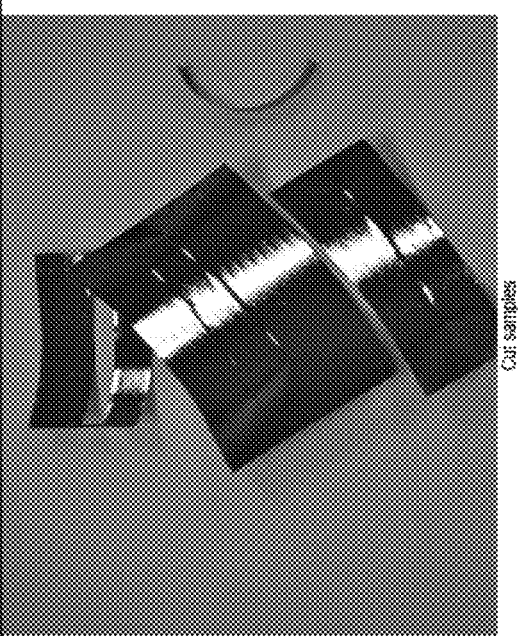
FIG. 2C
FIG. 2D
FIG. 2E

HIGH SPEED LASER CUTTING OF AMORPHOUS METALS

CROSS-REFERENCE TO RELATED APPLICATIONS

The present application claims the benefit of U.S. Provisional Application Ser. No. 61/985,720 filed Apr. 29, 2014, which is fully incorporated herein by reference.

TECHNICAL FIELD

The present invention relates to laser machining and more particularly, to high speed laser cutting of amorphous metals.

BACKGROUND INFORMATION

Certain types of materials, such as amorphous metals, are particularly difficult to cut without damaging the material. An amorphous metal ribbon or foil, for example, presents difficulties because the material is both very thin and hard. Attempts at using water jets have been successful but the process can be messy and expensive. Attempts at using lasers have often resulted in undesirable crystallization of the amorphous metal material, bubbling of the material at the cut edge, and other cutting defects, which may interfere with the use of the materials in certain applications. Attempts at laser cutting of amorphous materials have also failed to achieve desired cutting speeds.

SUMMARY

Consistent with an embodiment, a method is provided for laser cutting amorphous metal material. The method includes: generating a laser beam from a fiber laser with a power level greater than about 50 W; focusing the laser beam and directing the focused laser beam at the amorphous metal material with a beam spot size of about 30 microns or less; and moving the focused laser beam and the amorphous metal material relative to each other at a speed greater than about 18 inches per second such that the laser beam cuts the amorphous metal material.

Consistent with another embodiment, a method is provided for laser cutting amorphous metal ribbon having a thickness of less than about 30 microns. The method includes: generating a continuous wave (CW) single mode laser beam from a fiber laser with a power level greater than about 100 W and a wavelength in a range of about 1060 to 1080 nm; focusing the laser beam and directing the focused laser beam at the amorphous metal ribbon with a beam spot size in a range of about 10 to 30 microns; and moving the focused laser beam and the amorphous metal material relative to each other at a speed greater than about 100 inches per second such that the laser beam cuts the amorphous metal material.

BRIEF DESCRIPTION OF THE DRAWINGS

These and other features and advantages will be better understood by reading the following detailed description, taken together with the drawings wherein:

FIGS. 2C and 2D are electron micrographs of the cut edges shown in FIGS. 2A and 2B magnified further.

FIG. 2E is a photograph of a sample of the amorphous metal foil that was cut using a pulsed fiber laser.

DETAILED DESCRIPTION

Laser cutting systems and methods, as described in the present disclosure, are used to cut amorphous metal materials, such as thin amorphous metal ribbons or foils, with a relatively high speed. Embodiments of laser cutting systems and methods described herein also allow cutting with reduced crystallization, and thus reduced increases in thickness, at the cut edges and with reduced cracks or other cutting defects at the cut edges. A fiber laser, such as an Ytterbium fiber laser, is used to generate a laser beam with a power level greater than about 50 W. The laser beam is focused and directed at the amorphous metal material with a beam spot size of about 30 microns or less. The focused laser beam and the amorphous metal material are moved relative to each other at a speed greater than about 18 inches per second such that the focused laser beam cuts the amorphous metal material. The combination of the high power of the fiber laser and the high speeds allow the material to be cut with reduced crystallization or other defects at the cutting edges.

As used herein, "amorphous metal material" refers to a solid metal material, such as an alloy, with a non-crystalline, disordered atomic-scale structure. One example of an amorphous metal material includes an amorphous alloy such as the type known as Metglas® 2605 iron based alloy. A Metglas® 2605 SA1 iron based alloy, for example, has a composition including about 1-5 weight % boron, 85-95 weight % iron, and 5-10 weight % silicon and has a curie temperature of about 738° F. and a crystallization temperature of about 945° F. The amorphous metal material may be in the form of a thin sheet such as a ribbon or foil, for example, with a thickness in a range of about 20 to 30 microns. As used herein, "crystallization" refers to the formation of a crystalline structure as a result of melting and then re-solidification of the amorphous metal material.

Figure 1:
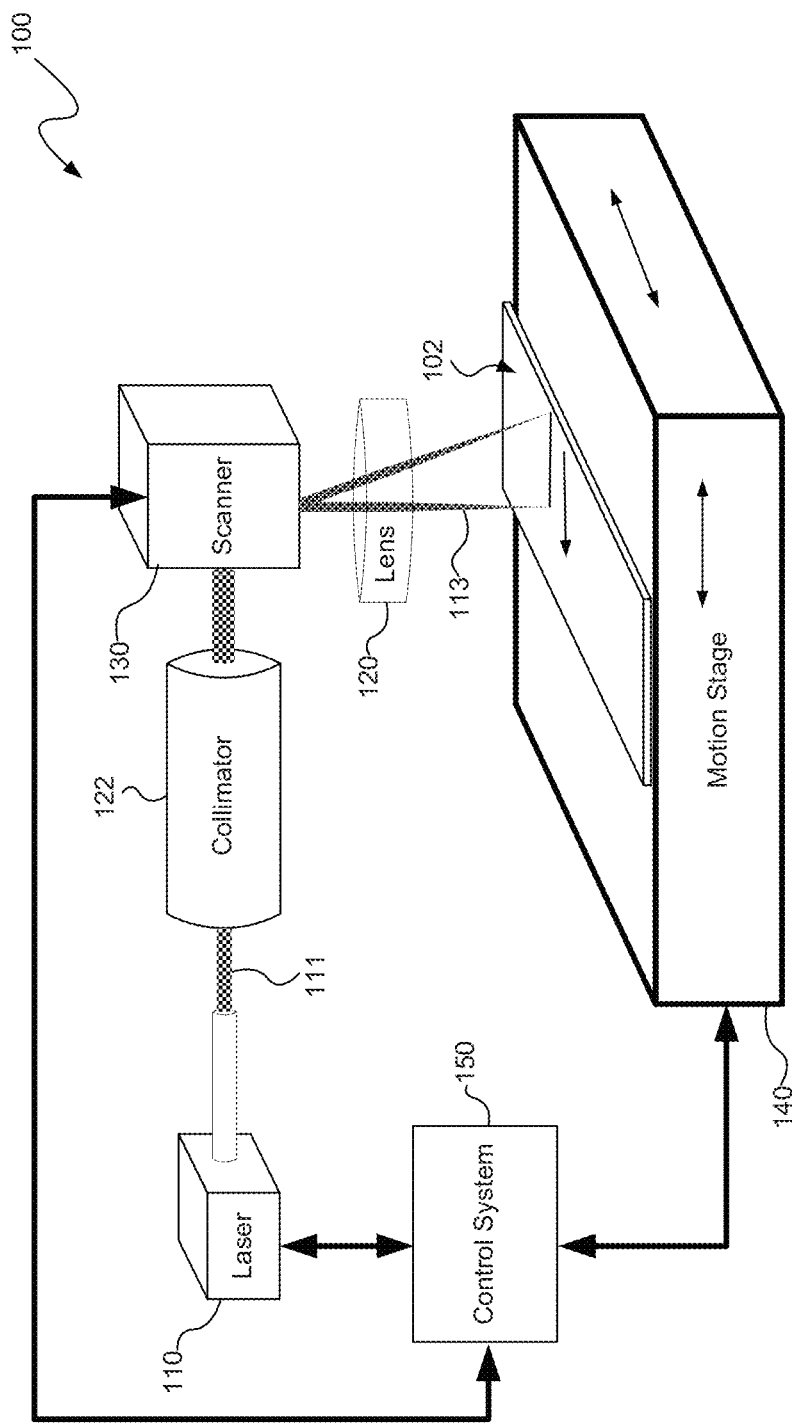
FIG. 1 is a laser cutting system for high speed cutting amorphous metals, consistent with the present disclosure.

Referring to FIG. 1, one embodiment of a laser cutting system 100 capable of cutting an amorphous metal material 102 is illustrated and described in greater detail. The laser cutting system 100 generally includes a fiber laser 110 for generating a laser beam 111 and a focus lens 120 for focusing the laser beam 111 to produce a focused laser beam 113. In the illustrated embodiment, the laser cutting system 100 also includes a collimator 122 to collimate the laser beam 111 before focusing and directing the focused laser beam 113 to the amorphous metal material 102. Alternatively or additionally, other optics may also be used for modifying and/or directing the laser light to the desired location. Such optics may include, without limitation, beam expanders, beam collimators, beam shaping lenses, reflectors, masks, and beamsplitters.

To provide the relative movement between the focused laser beam 113 and the amorphous metal material 102, the laser cutting system 100 also includes a scanner 130 and/or a motion stage 140. Although both the scanner 130 and the motion stage 140 are shown in the illustrated embodiment, the laser cutting system 100 may include one or the other. The scanner 130 moves the focused laser beam 113 relative to the amorphous metal material 102. The scanner 130 may include scanners known to those skilled in the art for scanning a laser beam to process a workpiece, such as the galvanometer scanner available under the name hurrySCAN® 30.

The motion stage 140 moves the amorphous metal material 102 relative to the focused laser beam 113. The motion stage 140 may include X-Y stages known to those skilled in the art. The motion stage 140 may be used to provide the high speed motion for cutting the amorphous metal material 102 and/or for positioning the amorphous metal material 102 while the scanner 130 scans the focused laser beam 113 on the amorphous metal material 102. A control system 150 may be used to control the laser 110, the scanner 130 and/or the motion stage 140. The control system 150 may include hardware and/or software known to those skilled in the art for controlling laser machining systems.

The fiber laser 110 may include a fiber laser capable of generating a laser beam with a wavelength in the near infrared range, such as an Ytterbium fiber laser in the 1060 to 1080 nm range. In some embodiments, the fiber laser 110 may be a pulsed fiber laser such as the high energy, Q-switched pulsed Ytterbium fiber lasers available from IPG Photonics in the YLP Series. One example of such a pulsed Ytterbium fiber laser provides a pulsed output beam with an average output power of up to 100 W, energy per pulse of 1 mJ, and a beam diameter of 7 mm. In other embodiments, the fiber laser 110 may be a continuous wave (CW) fiber laser such as the CW single mode Ytterbium fiber lasers available from IPG Photonics under the YLS, YLR or YLM Series. One example of such a CW single mode Ytterbium fiber laser has a fiber diameter of 14 µm and is capable of providing CW power of up to about 2 kW.

The focus lens 120 may be any focus lens capable of providing the desired focus and beam spot size on the amorphous metal material 102. Where the scanner 130 is used, the focus lens 120 may include an F-Theta lens capable of being used with the scanner 130. The collimator 122 may include collimators known to those skilled in the art for use with fiber lasers such as the collimators available from IPG Photonics.

According to a method of laser cutting amorphous metal material 102 using the laser cutting system 100, the fiber laser 110 is used to generate the laser beam 111 with a power level greater than about 50 W and the focused laser beam 113 is directed at the amorphous metal material 102 with a beam spot size of about 30 microns or less. The focused laser beam 113 and the amorphous metal material 102 may then be moved relative to each other either linearly or in a non-linear pattern such that the focused laser beam 113 cuts the amorphous metal material 102 with a cutting speed of greater than about 18 inches per second.

Where the fiber laser 110 is a pulsed laser, an acceptable cut may be achieved at cutting speeds of greater than about 18 inches per second with a power in a range of about 50 to 200 W, a pulse duration in a range of about 100 to 120 ns and a pulse frequency in a range of about 50 to 200 kHz. When the fiber laser 110 is a CW single mode laser, an even better cut may be achieved at cutting speeds of greater than about 275 inches per second with a power greater than about 450 W. With smaller beam spot sizes (e.g., about 10 microns), an acceptable cut may be achieved at cutting speeds as low as 100 inches per second with a CW single mode laser power level as low as 100 W. When used to cut thin amorphous metal materials, the cutting speed may be high enough to reduce crystallization at the cut edges, thereby reducing the increase in thickness at cut edges, for example, to less than about 50% of the thickness of the material, as will be described in greater detail below.

In several examples, a sample of Metglas® 2605 amorphous metal foil with a thickness between about 20-30 microns was cut using an Ytterbium fiber laser. In these examples, the laser beam was scanned and focused using an F-Theta lens. In some examples, a pulsed Ytterbium fiber laser was used, and in other examples, a CW single mode Ytterbium fiber laser was used. Different laser parameters were used in each of the examples as described below.

EXAMPLE 1

In this example, the amorphous metal foil sample was cut using a pulsed Ytterbium fiber laser with a power of 50 W, a beam diameter of 7 mm, energy per pulse of 1 mJ, a pulse frequency of 50 kHz, and pulse duration of 120 ns. The pulsed laser was scanned and focused with a 160 mm F-Theta lens. Using these parameters, the sample was cut with a cutting speed of 9 inches per second.

Figures 2A, 2B:
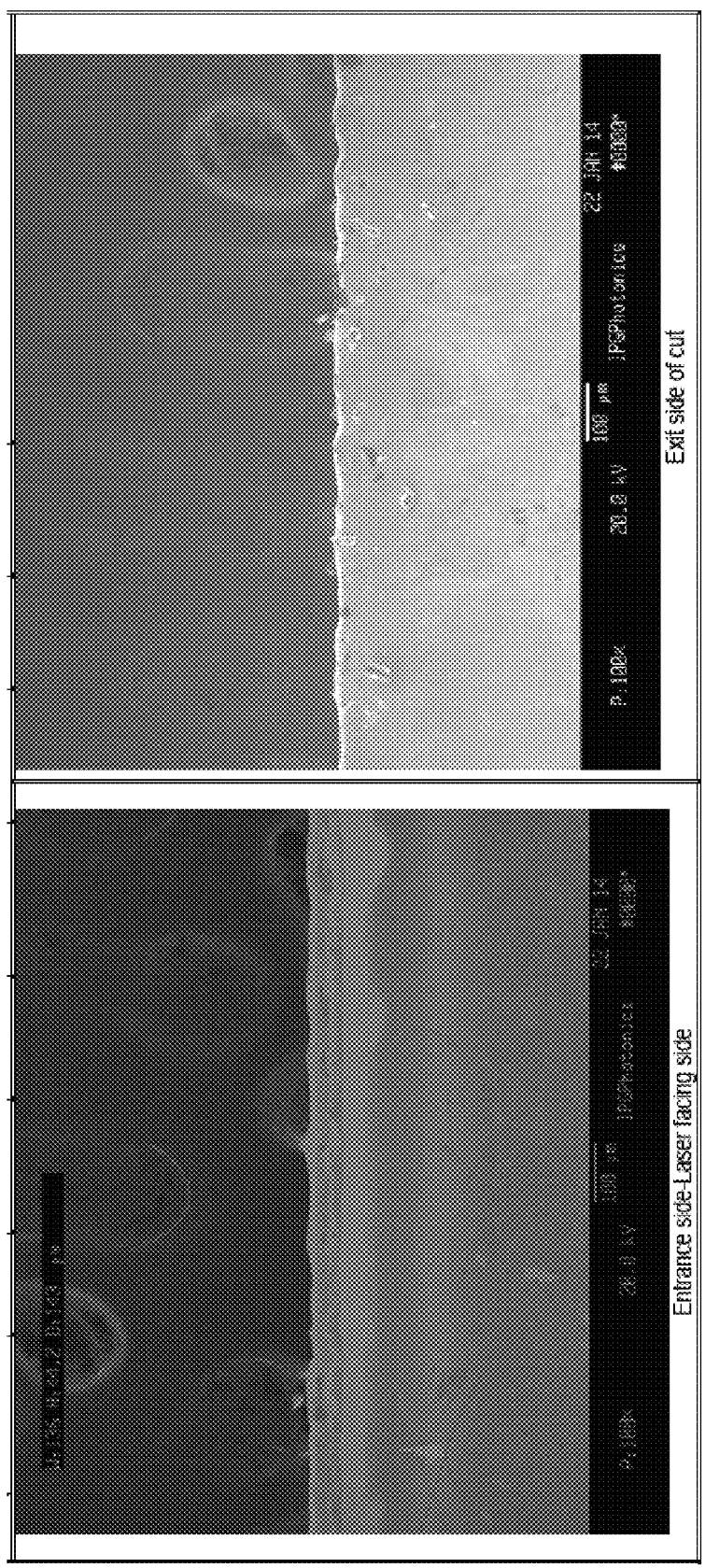
FIGS. 2A and 2B are electron micrographs of cut edges on an entrance side and exit side, respectively, of an amorphous metal foil cut using a pulsed fiber laser, consistent with one embodiment of the present disclose.

FIGS. 2A and 2B show the entrance (or laser facing) side and the exit side, respectively, of the amorphous metal foil sample cut after one pass of the pulsed laser beam in this example. FIGS. 2C and 2D show the entrance side and exit side, respectively, at 500× magnification. As shown, the material melts and crystallizes along the cut edge on the entrance side and the melt/crystallization extends about 35 microns into the material. FIG. 2E shows samples of the amorphous metal foil cut as described above.

EXAMPLE 2

In this example, the amorphous metal foil sample was cut using a pulsed Ytterbium fiber laser with a power of 50 W, a beam diameter of 7 mm, energy per pulse of 1 mJ, a pulse frequency of 100 kHz, and pulse duration of 100 ns. The pulsed laser was scanned and focused with a 160 mm F-Theta lens. Using these parameters, the sample was cut with a cutting speed of 29.5 inches per second. Thus, the higher pulse frequency and shorter pulse duration in this example allowed a higher cutting speed. In this example, the material curled slightly proximate the cut edge.

EXAMPLE 3

Figures 3A, 3B:
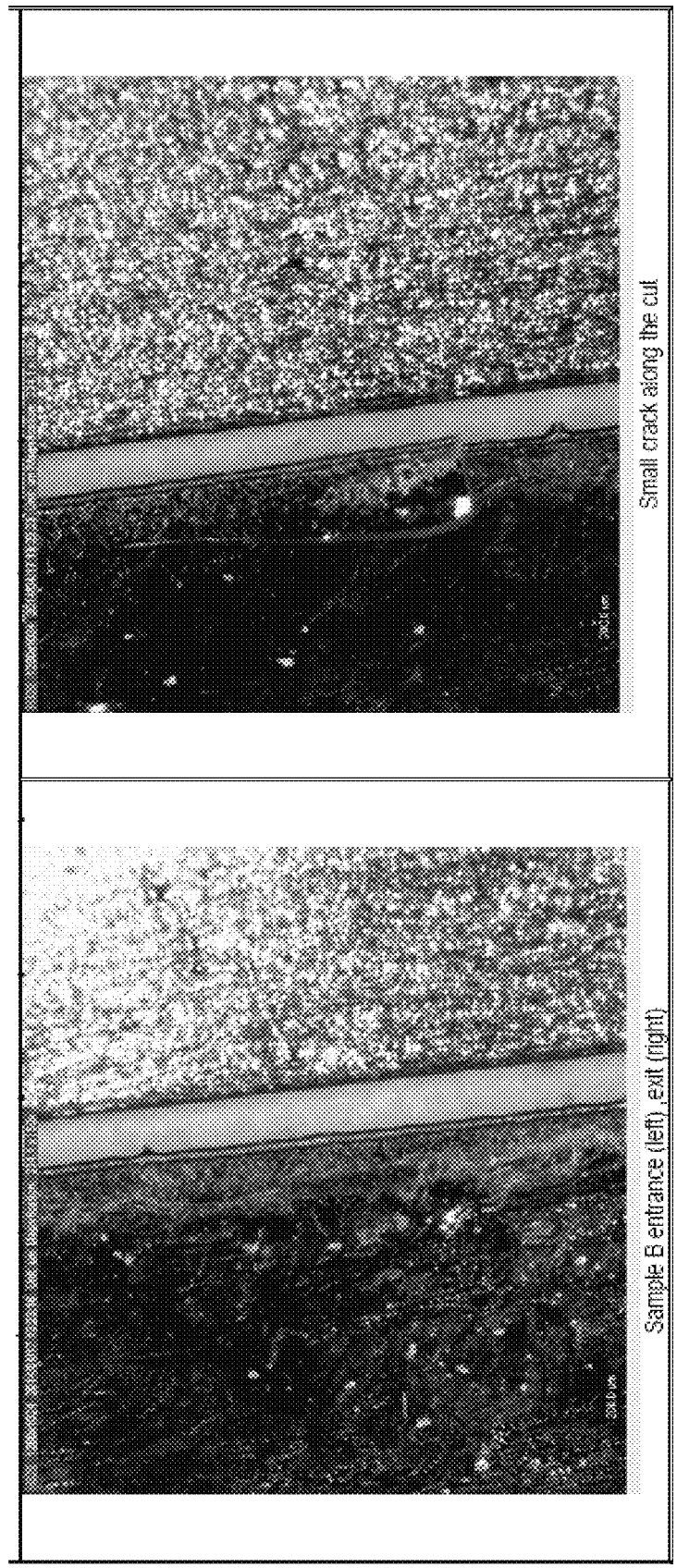
FIGS. 3A and 3B are electron micrographs of cut edges on an entrance side and exit side of an amorphous metal foil cut using a pulsed fiber laser, consistent with another embodiment of the present disclose.

In this example, the amorphous metal foil sample was cut using a pulsed Ytterbium fiber laser with a power of 95 W, a beam diameter of 7 mm, energy per pulse of 1 mJ, a pulse frequency of 200 kHz, and pulse duration of 100 ns. The pulsed laser was scanned and focused using a 160 mm F-Theta lens. Using these parameters, the sample was cut with a cutting speed of 55.11 inches per second. Thus, further increasing the power and the pulse frequency allowed even higher cutting speeds. In this example, the material curled slightly proximate the cut edge. FIG. 3A shows both the entrance side and the exit side of the amorphous metal foil sample cut after one pass of the pulsed laser beam in this example. FIG. 3B shows a crack formed along the cut edge.

EXAMPLE 4

Figures 4A, 4B:
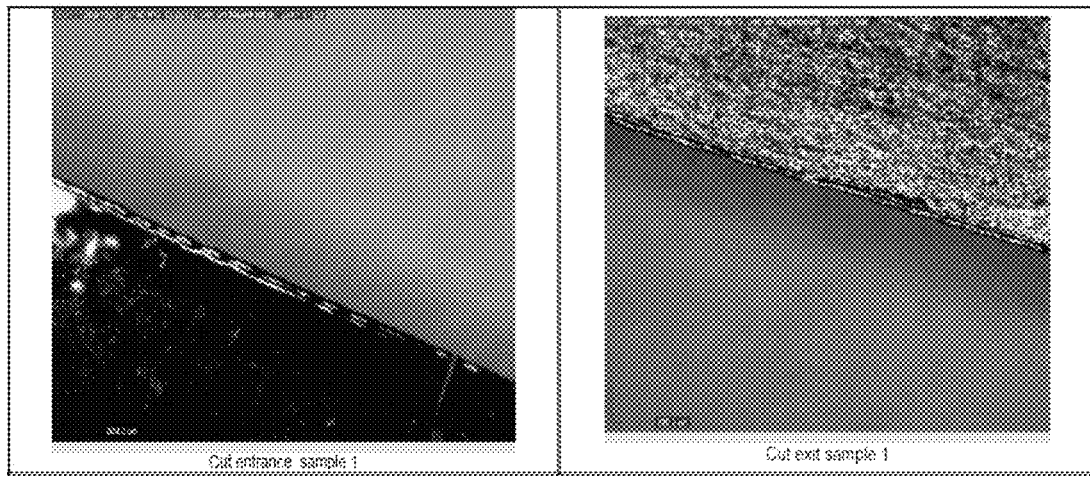
FIGS. 4A and 4B are electron micrographs of cut edges on an entrance side and exit side, respectively, of an amorphous metal foil cut using a continuous (CW) fiber laser, consistent with a further embodiment of the present disclose.

In this example, the amorphous metal foil sample was cut using a CW single mode Ytterbium fiber laser with a peak power of 70 W. The CW single mode Ytterbium fiber laser has a 14 µm fiber diameter and was used with a 120 mm collimator. The CW laser was scanned and focused using a 254 mm F-Theta lens to provide a spot size of 29 microns. Using these parameters, the sample was cut with a cutting speed of 35 inches per second. In this example, the material curled slightly proximate the cut edge. FIGS. 4A and 4B illustrate the entrance side and the exit side, respectively, of the amorphous metal foil sample cut after one pass of the CW laser beam in this example.

Figure 4C:
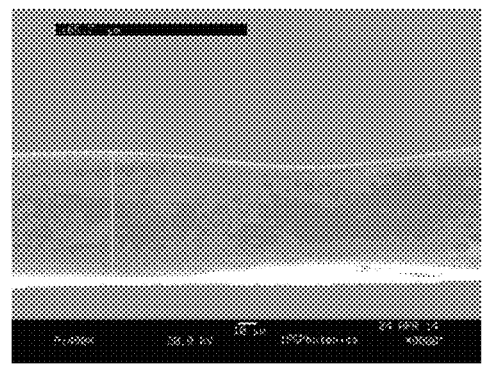
FIG. 4C is an electron micrograph of a cut edge consistent with the embodiment illustrated in FIGS. 4A and 4B and further magnified to illustrate a change in thickness at the cut edge.

FIG. 4C shows a further magnified cut edge of the amorphous metal foil sample in this example and illustrates that the cut edge has a thickness of about 60-70 microns. In other words, when cutting at the 35 inches per second in this example, the crystallization at the cut edge appears to have increased the thickness at the cut edge to more than twice the thickness of the foil sample (i.e., an increase in thickness of about 100-200%). FIG. 4C also shows that crystallization appears to occur on both sides of the cut edge when cutting at the slower speeds in this example.

Figure 4D:
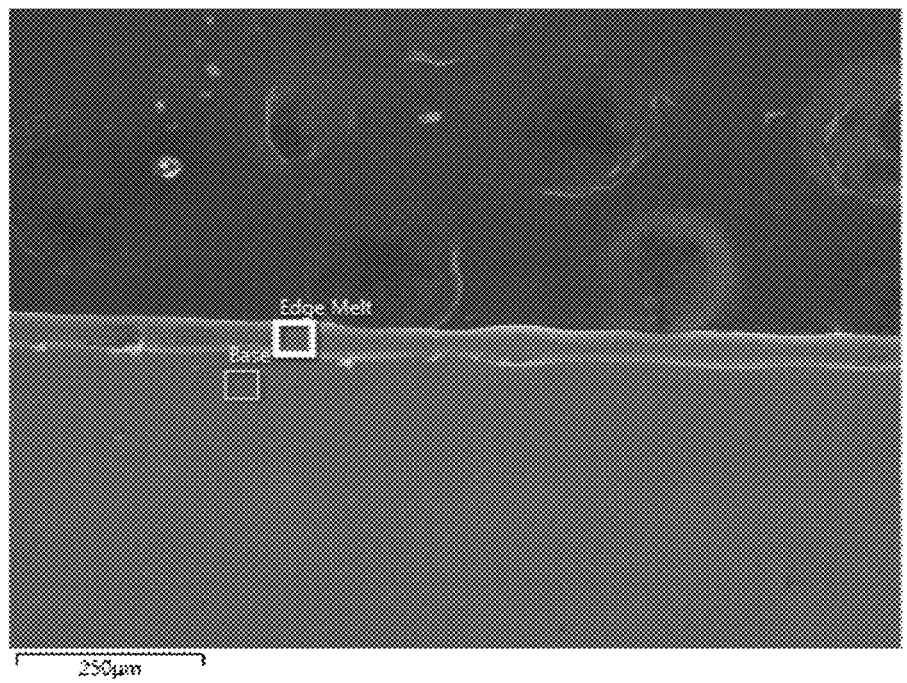
FIG. 4D is an electron micrograph of a laser cut edge consistent with the embodiment illustrated in FIGS. 4A and 4B and further illustrating the transition from the base metal to the crystallized laser cut edge.
Figure 4E:
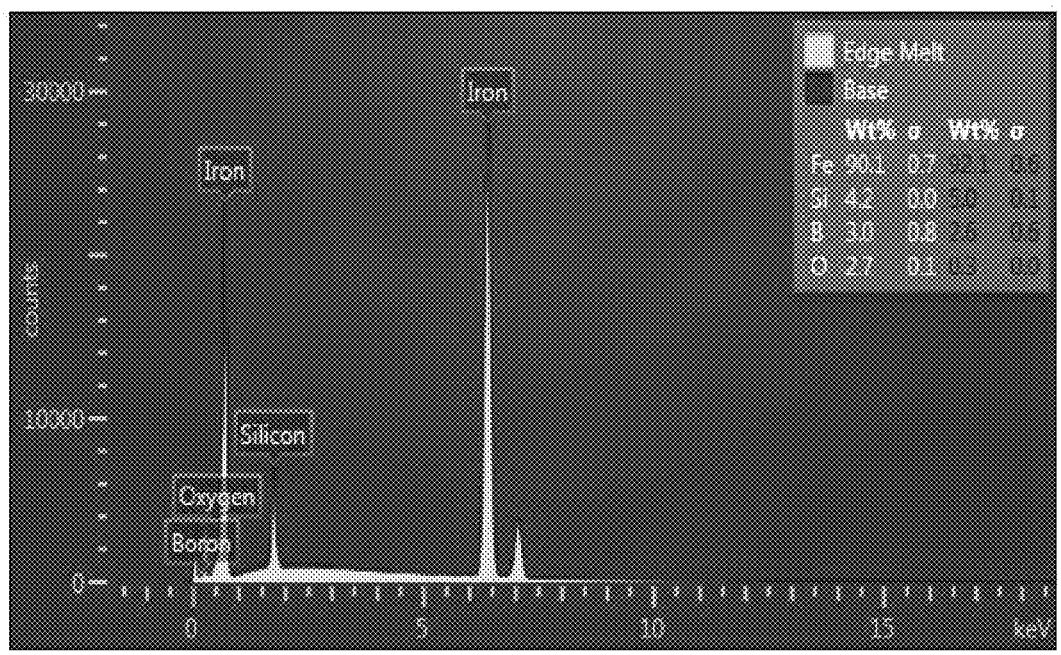
FIG. 4E illustrates spectra produced by energy-dispersive X-ray spectroscopy (EDS) showing material composition of the amorphous metal on the base metal and at the crystallized laser cut edge in FIG. 4D.

FIG. 4D illustrates a magnification of the transition from the base metal to a crystallized laser cut edge of an amorphous metal foil sample that has been cut according to Example 4. FIG. 4E illustrates EDS spectra produced by energy-dispersive X-ray spectroscopy (EDS) showing material composition on the base metal and at the crystallized laser cut edge of the sample shown in FIG. 4D. As illustrated, the weight percentage of oxygen is significantly higher in the edge melt region, which is indicative of oxidation.

EXAMPLE 5

Figures 5A, 5B:
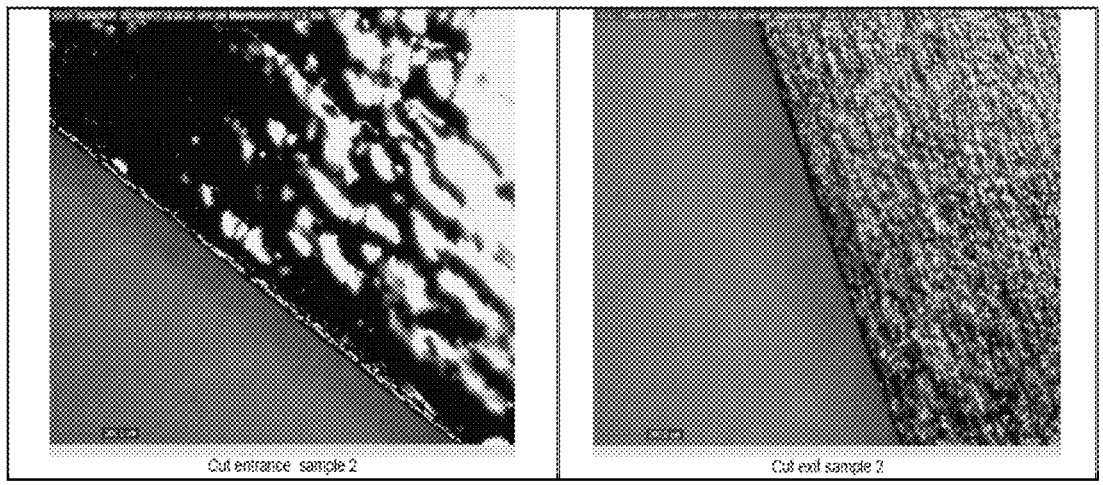
FIGS. 5A and 5B are electron micrographs of cut edges on an entrance side and exit side, respectively, of an amorphous metal foil cut using a CW fiber laser, consistent with yet another embodiment of the present disclose.

In this example, the amorphous metal foil sample was cut using a CW single mode Ytterbium fiber laser with a peak power of 450 W. The CW single mode Ytterbium fiber laser has a 14 µm fiber diameter and was used with a 120 mm collimator. The CW laser was scanned and focused using a 254 mm F-Theta lens to provide a spot size of 29 microns. Using these parameters, the sample was cut with a cutting speed of 413 inches per second. In this example, the material did not curl proximate the cut edge; however, a change in the melt pool dimensions at the cut edge resulted in the sample being prone to cracking. FIGS. 5A and 5B illustrate the entrance side and the exit side, respectively, of the amorphous metal foil sample cut after one pass of the CW laser beam in this example.

Figure 5C:
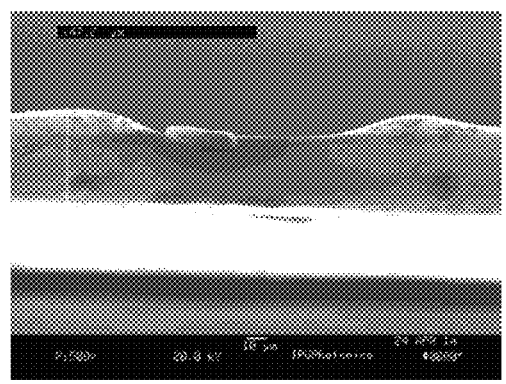
FIG. 5C is an electron micrograph of a cut edge consistent with the embodiment illustrated in FIGS. 5A and 5B and further magnified to illustrate a change in thickness at the cut edge.

FIG. 5C shows a further magnified cut edge of the amorphous metal foil sample in this example and illustrates that the cut edge has a thickness of about 40-50 microns. In other words, increasing the cutting speed to 413 inches per second in this example appears to have reduced the increase in thickness caused by crystallization at the cut edge to as low as about 33%.

EXAMPLE 6

Figures 6A, 6B:
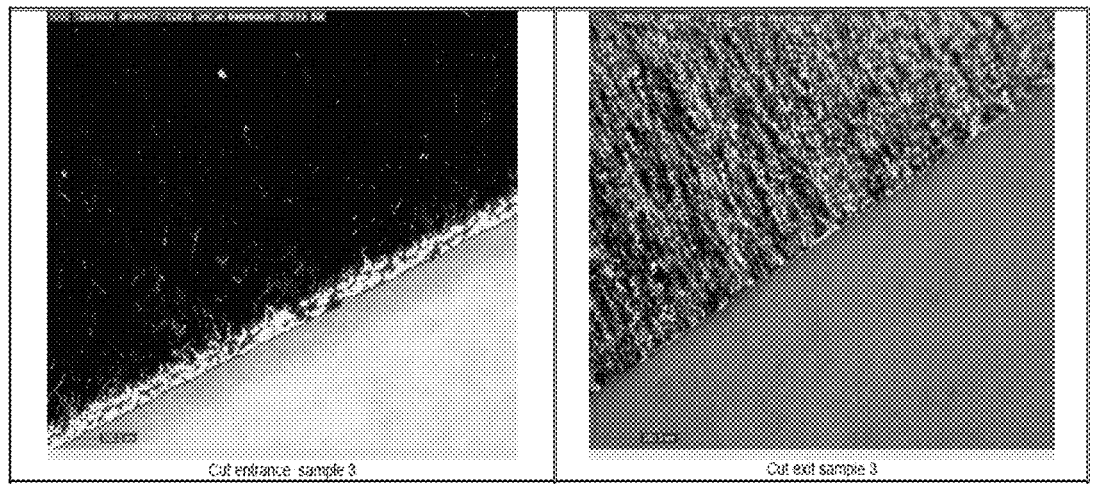
FIGS. 6A and 6B are electron micrographs of cut edges on an entrance side and exit side, respectively, of an amorphous metal foil cut using a CW fiber laser, consistent with yet another embodiment of the present disclose.

In this example, the amorphous metal foil sample was cut using a CW single mode Ytterbium fiber laser with a peak power of 690 W. The CW single mode Ytterbium fiber laser has a 14 µm fiber diameter and was used with a 120 mm collimator. The CW laser was scanned and focused using a 254 mm F-Theta lens to provide a spot size of 29 microns. Using these parameters, the sample was cut with a cutting speed of 531 inches per second. In this example, a clean cut was made with minimal crystallization at the cut edge and the material did not curl proximate the cut edge. FIGS. 6A and 6B illustrate the entrance side and the exit side, respectively, of the amorphous metal foil sample cut after one pass of the CW laser beam in this example.

Figure 6C:
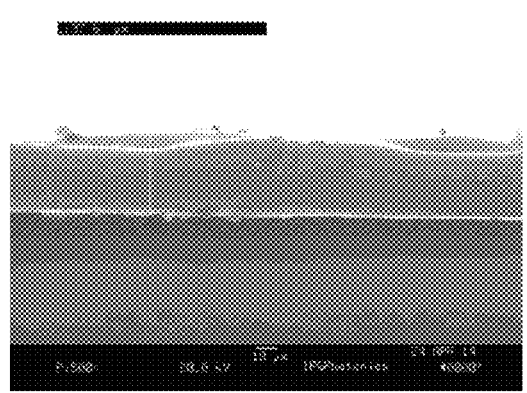
FIG. 6C is an electron micrograph of a cut edge consistent with the embodiment illustrated in FIGS. 6A and 6B and further magnified to illustrate a change in thickness at the cut edge.

FIG. 6C shows a further magnified cut edge of the amorphous metal foil sample in this example and illustrates that the cut edge has a thickness of about 35-40 microns. In other words, increasing the cutting speed to 531 inches per second in this example appears to have further reduced the increase in thickness caused by crystallization at the cut edge to as low as about 17%.

Figure 6D:
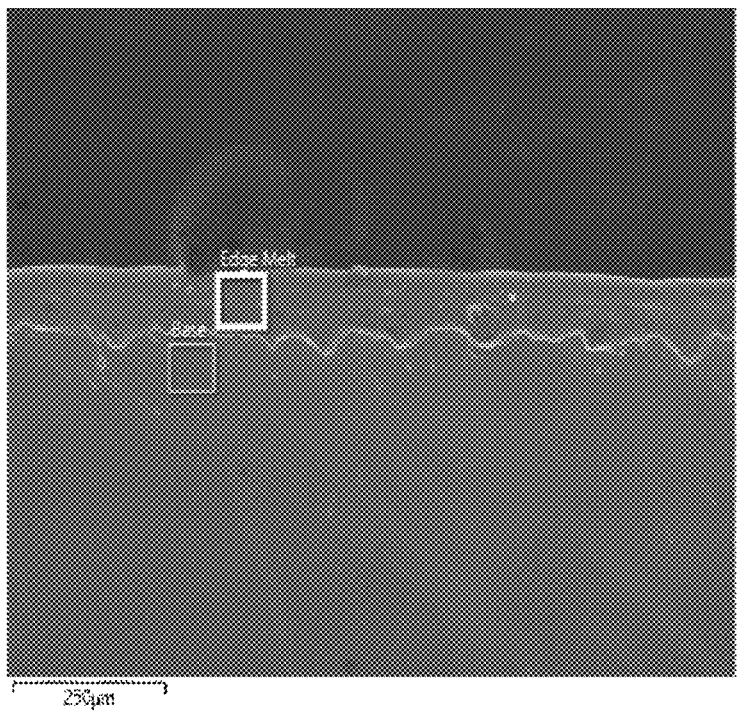
FIG. 6D is an electron micrograph of a laser cut edge consistent with the embodiment illustrated in FIGS. 6A and 6B and further illustrating the transition from the base metal to the crystallized laser cut edge.
Figure 6E:
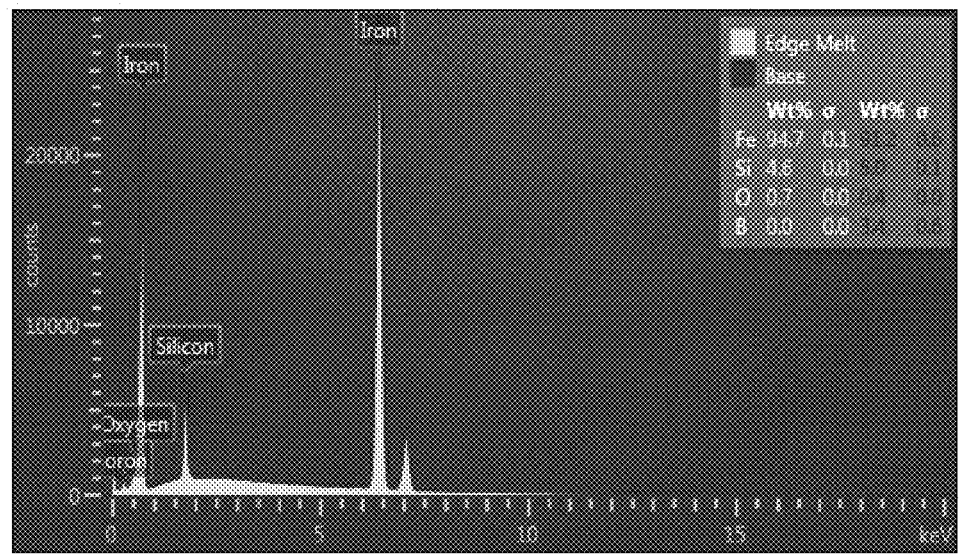
FIG. 6E illustrates spectra produced by energy-dispersive X-ray spectroscopy (EDS) showing material composition of the amorphous metal on the base metal and at the crystallized laser cut edge in FIG. 6D.

FIG. 6D illustrates a magnification of the transition from the base metal to a crystallized laser cut edge of an amorphous metal foil sample that has been cut according to Example 6. FIG. 6E illustrates EDS spectra produced by energy-dispersive X-ray spectroscopy (EDS) showing material composition on the base metal and at the crystallized laser cut edge of the sample shown in FIG. 6D. As illustrated, the weight percentage of oxygen is only slightly higher in the edge melt region. In other words, the higher cutting speed appears to have resulted in minimal oxidization along the cut edge.

According to the above examples, the material curls up easily if too much heat is introduced when cutting. These examples suggest three cutting regimes that produce different qualities of cut. In a first regime at lower cutting speeds, for example, as illustrated by Examples 1-3, the cut edge is crystallized (i.e., well rounded) and the material curls. In a second regime at higher cutting speeds, for example, as illustrated by Example 5, the melt pool dimension changes and the area where the melt pool narrows may become prone to cracking. In a third regime at even higher cutting speeds, for example, as illustrated by Example 6, the material is removed very quickly and the edges do not bead up like at lower speeds, resulting in a clean cut and flat material that does not curl up.

It appears that the above regimes can exist for a given amount of energy deposited per length of travel (e.g., Joules/mm). In some examples, the samples were cut without curling when the energy per length of travel was in the range of 45 to 75 mJ/m; however, energy per length of travel may vary and may be dependent upon the heat conductivity of the material. The key to achieve curl free and crack free cuts is to minimize the heat input (i.e., amount of time for heat to travel laterally into the material). If this heat input is too long, the material is well rounded along the cut edge. Even if the heat input is reduced, the regime may be transitional and cracking may occur. When the heat input is shortest at the higher speeds, clean cutting occurs and there is reduced crystallization along the edge.

The above examples further illustrate that the material thickness and oxidation along the cut edge is a function of cutting speeds. The higher cutting speeds (e.g., Example 6) resulted in the lowest increases in thickness at the cut edges. Reducing this increase in thickness at the cut edges is particularly advantageous in applications where an amorphous metal foil is used in a transformer. The amorphous metal foils are wound tightly when the transformer is manufactured and the efficiency of the transformer may be improved when the amorphous metal foils are wound more densely, which is possible when the increase in thickness at the cut edges is reduced.

Accordingly, fiber lasers may be used to cut thin amorphous metal foils at high speeds and with reduced crystallization or other cutting defects. In particular, a single mode CW laser focused between 10-30 microns with up to 2 kW power may be used to cut thin amorphous metal material very easily, with high speeds, and with reduced crystallization and cutting defects. Cutting speeds as high as 14 m/sec may be achieved with a CW laser at 700 W. In general, the higher powers allow faster cutting speeds.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A method for laser cutting amorphous metal material, the method comprising:
    generating a laser beam from a fiber laser with a power level greater than about 50 W;
    focusing the laser beam and directing the focused laser beam at the amorphous metal material with a beam spot size of about 30 microns or less; and
    moving the focused laser beam and the amorphous metal material relative to each other at a speed greater than about 18 inches per second such that the laser beam cuts the amorphous metal material.

2. The method of claim 1 wherein the amorphous metal material is formed as a ribbon or foil.

3. The method of claim 1 wherein the amorphous metal material has a thickness of less than about 30 microns.

4. The method of claim 3 wherein the laser beam cuts the amorphous metal material such that an increase in thickness at a cut edge of the material resulting from laser cutting is less than 50% of the thickness of the amorphous metal material.

5. The method of claim 1 wherein the amorphous metal material has a thickness in a range of about 20 to 30 microns.

6. The method of claim 1 wherein the amorphous metal material includes a magnetic alloy.

7. The method of claim 1 wherein the laser beam has a wavelength in the near infrared range.

8. The method of claim 1 wherein the laser beam has a wavelength in the 1060-1080 nm range.

9. The method of claim 1 wherein the laser beam is a pulsed laser beam.

10. The method of claim 9 wherein the pulsed laser beam is generated with a pulse duration in a range of about 100 to 120 ns and a pulse frequency in a range of about 50 to 200 kHz.

11. The method of claim 1 wherein the laser beam is a continuous wave laser beam.

12. The method of claim 1 wherein the fiber laser is an ytterbium fiber laser.

13. The method of claim 1 wherein moving the focused laser beam and the amorphous metal material includes scanning the laser beam.

14. The method of claim 1 wherein moving the focused laser beam and the amorphous metal material includes moving the amorphous metal material.

15. The method of claim 1 wherein the focused laser beam and the amorphous metal material are moved relative to each other linearly to cut in a linear direction.

16. The method of claim 1 wherein the focused laser beam and the amorphous metal material are moved relative to each other according to a pattern to cut in a pattern.

17. A method for laser cutting amorphous metal ribbon having a thickness of less than about 30 microns, the method comprising:
    generating a continuous wave (CW) single mode laser beam from a fiber laser with a power level greater than about 100 W and a wavelength in a range of about 1060 to 1080 nm;
    focusing the laser beam and directing the focused laser beam at the amorphous metal ribbon with a beam spot size in a range of about 10 to 30 microns; and
    moving the focused laser beam and the amorphous metal material relative to each other at a speed greater than about 100 inches per second such that the laser beam cuts the amorphous metal material.

18. The method of claim 17 wherein the fiber laser is an ytterbium fiber laser.

19. The method of claim 17 wherein moving the focused laser beam and the amorphous metal material includes scanning the laser beam.

20. The method of claim 17 wherein the amorphous metal material includes an amorphous metal ribbon or foil with a thickness in a range of about 20 to 30 microns.

21. The method of claim 17 wherein the amorphous metal material includes a magnetic alloy.

22. The method of claim 17 wherein the laser beam cuts the amorphous metal ribbon such that an increase in thickness at a cut edge of the ribbon resulting from laser cutting is less than 50% of the thickness of the amorphous metal ribbon.

* * * * *